United States Patent
Ghanem

(10) Patent No.: US 12,496,724 B1
(45) Date of Patent: Dec. 16, 2025

(54) SYSTEMS AND METHODS FOR MOUNTING WHEELS TO PARTIALLY ASSEMBLED VEHICLES IN MOTION

(71) Applicant: ProcessChamp, LLC, Columbus, OH (US)

(72) Inventor: George Ghanem, Columbus, OH (US)

(73) Assignee: ProcessChamp, LLC, Columbus, OH (US)

( * ) Notice: Subject to any disclaimer, the term of this patent is extended or adjusted under 35 U.S.C. 154(b) by 364 days.

(21) Appl. No.: 18/142,403

(22) Filed: May 2, 2023

Related U.S. Application Data

(60) Provisional application No. 63/337,719, filed on May 3, 2022.

(51) Int. Cl.
  *B25J 9/16* (2006.01)
  *B23P 19/04* (2006.01)
  *B25J 9/00* (2006.01)

(52) U.S. Cl.
  CPC ............. *B25J 9/1697* (2013.01); *B23P 19/04* (2013.01); *B25J 9/0084* (2013.01)

(58) Field of Classification Search
  None
  See application file for complete search history.

(56) References Cited

U.S. PATENT DOCUMENTS

| | | |
|---|---|---|
| 5,771,553 A | 6/1998 | Sim et al. |
| 5,848,747 A | 12/1998 | Nishi |
| 6,273,483 B1 | 8/2001 | Bone |
| 6,381,556 B1 | 4/2002 | Kazemi |
| 8,180,487 B1 | 5/2012 | Vangal-Ramamurthy et al. |
| 10,049,443 B2 | 8/2018 | Bartos et al. |
| 10,095,214 B2 | 10/2018 | Ghanem |
| 10,101,725 B2 | 10/2018 | Ghanem |
| 10,272,530 B2 * | 4/2019 | Reid .......................... B25J 5/02 |
| 10,551,179 B2 | 2/2020 | Lonsberry et al. |

(Continued)

FOREIGN PATENT DOCUMENTS

| | | |
|---|---|---|
| WO | 2005087451 A1 | 9/2005 |
| WO | 2005105389 A1 | 11/2005 |

OTHER PUBLICATIONS

WIRED, How the Tesla Model S is Made—Tesla Motors Part 1 youtube video webpage, Jul. 16, 2013, 2 pages.

*Primary Examiner* — Hua Lu
(74) *Attorney, Agent, or Firm* — Standley Law Group LLP; Jeffrey S. Standley; Adam J. Smith

(57) ABSTRACT

Systems and methods for mounting wheels to partially assembled vehicles in motion using machine vision systems and artificial intelligence software are provided. Lug nut handling robots pick and place lug nuts at wheels for the vehicles. Wheel handling robots pick up the wheels and lug nuts, travel through the work area alongside the conveying subassembly at matched speed and position, and synchronously place the wheels at the vehicle under the command of a controller based on data received from sensors and machine vision systems regarding speed and position of the vehicle in the work area, wheel rim hole positions, and wheel hub position. This data is processed by an artificial intelligence model to calculate offsets between the measured rim hole positions and reference rim hole positions as well as the measured wheel hub position and reference wheel hub position to achieve the synchronous placement.

20 Claims, 9 Drawing Sheets

(56) References Cited

U.S. PATENT DOCUMENTS

| | | | |
|---|---|---|---|
| 10,571,889 B2 | 2/2020 | Ghanem | |
| 10,591,277 B2 | 3/2020 | Kallay et al. | |
| 11,029,713 B2 | 6/2021 | Haven et al. | |
| 2010/0145511 A1* | 6/2010 | Popa | B62D 57/02 700/245 |
| 2013/0158709 A1* | 6/2013 | Shi | B25J 9/0084 901/47 |
| 2013/0329012 A1 | 12/2013 | Bartos et al. | |
| 2014/0195094 A1* | 7/2014 | Popa | B25J 9/1697 701/25 |
| 2015/0104284 A1 | 4/2015 | Riedel | |
| 2015/0120054 A1 | 4/2015 | Watanabe | |
| 2015/0190926 A1 | 7/2015 | Miegel et al. | |
| 2017/0275026 A1* | 9/2017 | Szarski | B25J 9/0084 |
| 2018/0035606 A1* | 2/2018 | Burdoucci | A01D 34/008 |
| 2018/0043540 A1 | 2/2018 | Satou | |
| 2018/0120218 A1 | 5/2018 | Shultis et al. | |
| 2019/0076949 A1 | 3/2019 | Atherton et al. | |
| 2019/0138009 A1 | 5/2019 | Saito | |
| 2019/0143541 A1 | 5/2019 | Nemallan | |
| 2019/0317486 A1* | 10/2019 | Ghanem | G05B 19/4183 |
| 2019/0331480 A1 | 10/2019 | Lonsberry et al. | |
| 2019/0332084 A1 | 10/2019 | Haven | |
| 2020/0061828 A1* | 2/2020 | Yin | B25J 19/023 |
| 2020/0061840 A1* | 2/2020 | Yin | B25J 9/0084 |
| 2020/0108659 A1* | 4/2020 | Downey | B60B 29/001 |
| 2020/0130189 A1* | 4/2020 | Ghanem | B25J 9/1697 |
| 2020/0140028 A1* | 5/2020 | Wells | G05D 1/0225 |
| 2020/0240772 A1 | 7/2020 | Lonsberry et al. | |
| 2020/0262057 A1 | 8/2020 | Saez et al. | |
| 2020/0262078 A1 | 8/2020 | Saez et al. | |
| 2020/0262079 A1 | 8/2020 | Saez et al. | |
| 2020/0376671 A1* | 12/2020 | Taylor | B25J 9/1687 |
| 2020/0377004 A1 | 12/2020 | Zhang et al. | |
| 2020/0377012 A1 | 12/2020 | Saez et al. | |
| 2020/0380273 A1 | 12/2020 | Saez et al. | |
| 2020/0398743 A1 | 12/2020 | Huber et al. | |
| 2021/0042665 A1* | 2/2021 | Ghanem | B25J 9/163 |
| 2021/0114408 A1* | 4/2021 | Darolfi | B60B 29/00 |
| 2021/0150760 A1 | 5/2021 | Haven et al. | |
| 2021/0237200 A1 | 8/2021 | Wang et al. | |
| 2021/0237211 A1 | 8/2021 | Saez et al. | |
| 2021/0237212 A1 | 8/2021 | Saez et al. | |
| 2021/0387346 A1* | 12/2021 | Gillett | B25J 19/0075 |
| 2022/0152785 A1 | 5/2022 | Skurkis et al. | |
| 2022/0176564 A1 | 6/2022 | Saez et al. | |
| 2022/0244142 A1* | 8/2022 | Breton | H04N 23/90 |
| 2023/0052365 A1* | 2/2023 | Vargo | B60B 29/001 |
| 2023/0083349 A1* | 3/2023 | Kranski | G06N 3/008 706/14 |

* cited by examiner

SYSTEMS AND METHODS FOR MOUNTING WHEELS TO PARTIALLY ASSEMBLED VEHICLES IN MOTION

CROSS-REFERENCE TO RELATED APPLICATIONS

This application claims the benefit of U.S. Provisional Application Ser. No. 63/337,719 filed May 3, 2022, the disclosures of which are hereby incorporated by reference as if fully restated herein.

TECHNICAL FIELD

Exemplary embodiments relate generally to systems and methods for mounting wheels to partially assembled vehicles in motion, such as using machine vision components powered by artificial intelligence ("AI") software.

BACKGROUND AND SUMMARY OF THE INVENTION

Since the days of Henry Ford, vehicles are commonly mass produced on an assembly line. Under this manufacturing scheme, vehicle frames may be moved through a factory space while undergoing further assembly, which may include modifications to the frame itself (e.g., welding, painting) and/or the addition or components to the frame (e.g., doors, seating, engine and powertrain, suspension, entertainment systems, and the like). One such component that eventually needs added to all automobiles is the wheel. The typical automobile includes four wheels, two of which are mounted to each of two axles. However, other types of vehicles exist which include fewer or greater axles and/or wheels in various arrangements.

Mounting wheels to axles typically requires aligning holes within a wheel to studs extending from a hub and bearing assembly, which is mounted to the axle. Variations on the exact arrangement and mounting configuration exist. Regardless, careful alignment is needed. This sometimes requires that the vehicle frame or other components be held stationary while the mounting is accomplished. Regardless, the wheels are generally mounted manually so that an operator can visually adjust the wheel position for proper alignment and mounting.

While certain benefits may arise from automating vehicle production, automating wheel mounting is particularly difficult due to unique alignment issues, such as with the wheel stud and hole arrangement and variations in wheel and hub presentation. For example, without limitation, stud arrangement within hubs, hub arrangement on axles, wheel hole arrangement within wheels, vehicle frame presentation, hub presentation, combinations thereof, or the like, may not be uniform or consistent. These inconsistencies may require on-the-fly, vehicle specific adjustments for successful mounting, which heretofore required manual operation.

What is needed is a system and method for mounting wheels to partially assembled vehicles in motion. Systems and methods for mounting wheels to partially assembled vehicles in motion are provided. The disclosed systems and methods may utilize one or more machine vision components to identify mounting points for the wheels, such as by use of cameras and artificial intelligence ("AI") software. The systems and methods disclosed may permit mounting in a fixtureless manner.

The system may comprise partially assembled vehicles mounted to or otherwise carried by a conveyor system of various type. Once sensors are connected and calibrated, the system may be activated for regular production.

As a vehicle is moved into an assembly zone, it may be detected by a parts sensor. A first camera may be activated to collect hub information, such as position and presentation of the hub and/or wheel studs. The vehicle's velocity may be monitored by velocity sensors as the vehicle continues through the assembly zone. The velocity sensors may be activated when the parts sensor and/or camera detect the vehicle. A second camera may be activated to collect wheel information, such as position and presentation of the wheel and/or stud holes. Lug nuts may be placed at the wheel, such as by a lug nut dispensing subsystem. Collected data regarding the hubs, wheels, and/or vehicle velocity may be transmitted to a controller. The controller may utilize software, such as but not limited to a multi-iterative, best fit, weighted vector analysis, to determine offsets for the wheel placement against reference points. Robot(s) may be commanded to pick up the wheels, such as with the lug nuts, and moved along synchronously with the vehicle within the assembly zone to install the wheels at the hubs. The lug nuts may be subsequently secured to affix the wheels.

An inspection scan may be performed and updates may be provided to the controller to optimize further production, such as using artificial intelligence technology to update the weights applied to the multi-iterative, best fit, weighted vector analysis.

The robot(s) may be returned to a home position to await a next vehicle.

While primarily discussed with regard to wheel mounting, the system, method, and/or components shown and/or described herein may be utilized for synchronous, fixtureless mounting and/or other installation of other vehicle components (e.g., instruments, entertainment systems, navigation systems, trim, operational controls, seating, and the like).

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
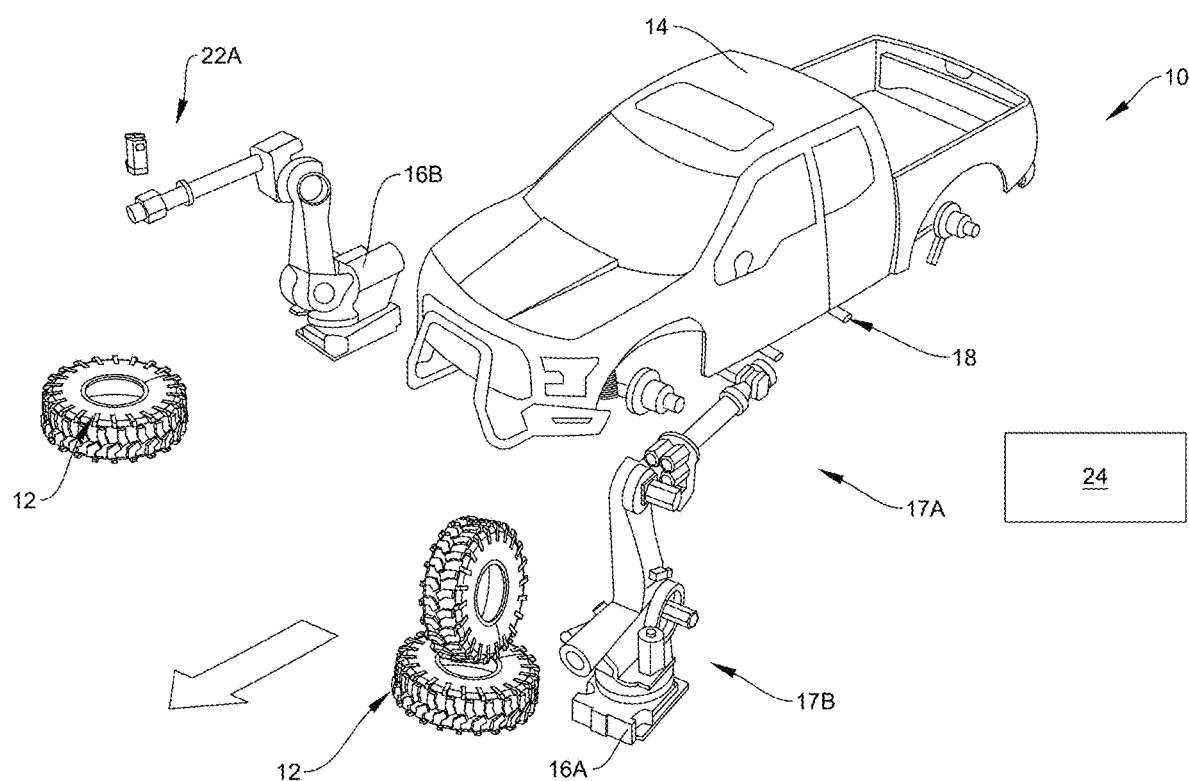
FIG. 1 is a perspective view of an exemplary system for mounting wheels to partially assembled vehicles in motion.
Figure 2:
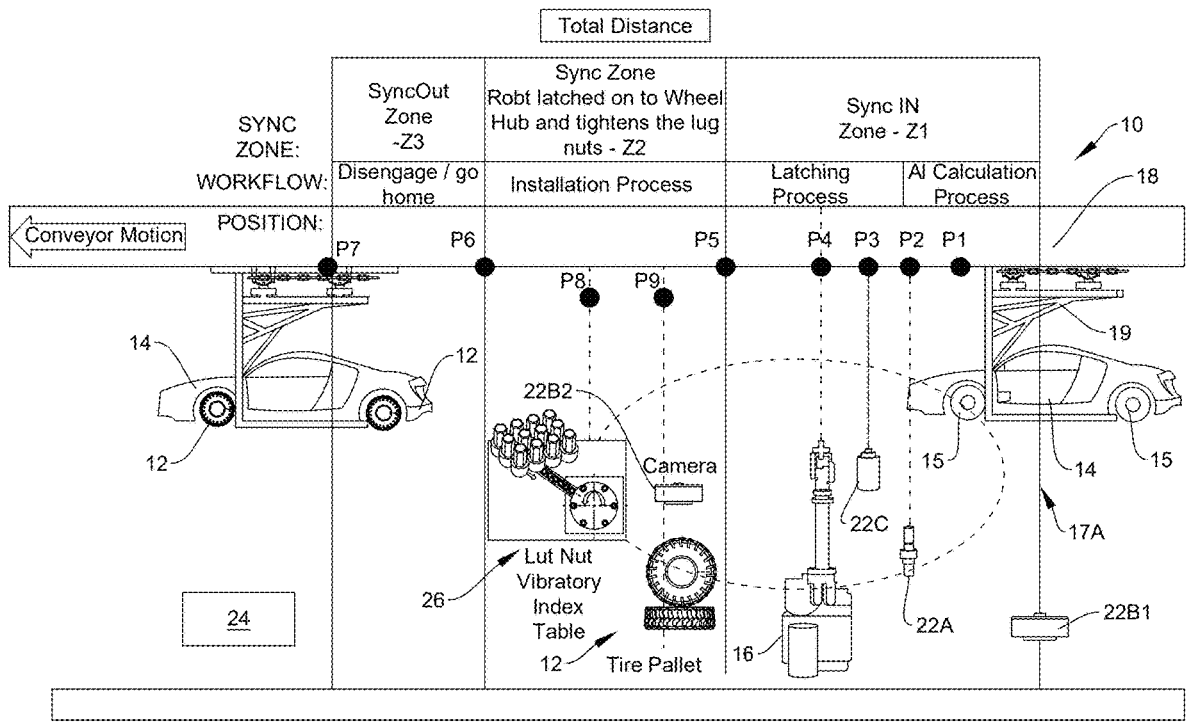
FIG. 2 is a side view of another exemplary embodiment of the system of FIG. 1 with annotations in the form of a timeline identifying assembly processes.

FIG. 1 and FIG. 2 illustrates an exemplary system 10 for mounting wheels 12 to partially assembled vehicles 14 which are in motion. The system 10 may comprise one or more conveyors 18 and/or related components such as, but not limited to, belts, trolleys, hangers, autonomous motorized vehicles (AMVs) 31, fixtures, combinations thereof, or the like for holding the partially assembled vehicles 14 and moving them through the system 10 and/or a larger assembly line, such as an assembly line or factory floor. The conveyor 18 may be dedicated for the system 10 or be part of a larger conveyor 18 and/or assembly line. The AMVs 31 may comprise autonomous guided vehicles, autonomous mobile robots, combinations thereof, or the like.

In exemplary embodiments, without limitation, operation of the AMVs 31 and associated components, such as but not limited to the partially assembled vehicles 14, may be accomplished using the systems, methods, and/or components shown and/or described in U.S. Pat. No. 11,294,363 issued Apr. 5, 2022 and hereby incorporated by reference. In this manner, by way of non-limiting example, the vehicle 14 may be kept in motion about a factory floor or other facility for installation of multiple components, including, but not limited to, the wheels 12. For example, the same or similar embodiments of the system 10, or components thereof such as the robot(s) 16 and/or controllers 24, may be adapted for mounting or otherwise installing other vehicle 14 components while partially assembled while the vehicle 14 is moving, including but not necessarily limited to, seating, interior fabric, entertainment systems, navigational systems, instruments, interior trim, safety components, vehicle 14 controls, combinations thereof, or the like, such as in a fixtureless manner.

The system 10 may comprise one or more robots 16. The robots 16 may be configured for three-dimensional movement, such as within one or more assembly zones. The robots 16 may be configured for grabbing, placing, and/or securing the wheels 12 and/or related components, such as, but not limited to, lug nuts 20. Some or all of the robots 16 may comprise generalized or specialized components adapted for the same including, but not limited to, grippers, wrenches (e.g., lug wrenches), nut runners, vacuum devices, machine vision systems or components thereof, sensors, combinations thereof, or the like. Multiple robots 16A, 16B may be provided, such as on opposing sides of the conveyor 18 and/or different locations along the conveyor 18, to address opposing sides of the vehicle 14 and/or to perform various functions (e.g., wheel 12 placement, lug nut 20 placement, lug nut 20 securement, combinations thereof, or the like) along the conveyor 18. Alternatively, or additionally, a single robot 16 or single one of the robots 16 may be configured to mount multiple wheels 12 and/or perform multiple functions.

The system 10 may comprise sensors 22 or a same or various type. The sensors 22 may be in electronic communication, wired and/or wirelessly, with one or more controller 24.

The sensors 22 may comprise one or more part sensors 22A. The part sensor(s) 22A may be configured to detect the presence of the vehicle 14, or portions thereof, within a particular area or zone. The part sensor(s) 22A may comprise, for example without limitation, lasers, photo eyes, ultrasonic emitters/detectors, proximity detectors, machine vision systems, magnetic field detectors, combinations thereof, or the like. Some or all of the sensors 22A may be used by the controller 24 to establish a nominal tracking position coordinate frame 17A for the vehicle 14, sometimes referred to herein as "Tnom". Coordinate frames 17B may, alternatively or additionally, be established at one or more or the robots 16 and/or at other locations.

The sensors 22 may, alternatively or additionally, comprise one or more machine vision systems 22B. Each of the machine vision system(s) 22B may comprise one or more cameras. The machine vision system(s) 22B may work together or independent of one another and/or other sensors 22. The machine vision system(s) 22B1, 22B2, or components thereof such as the cameras, may be mounted to the robot(s) 16, along the conveyor 18, within one or more zones of the conveyor 18, overhead, forward of one or more assembly zones, behind one or more assembly zones, at the floor of one or more assembly zones, combinations thereof, or the like. In exemplary embodiments, without limitation, a first machine vision system 22B1 may be located at a material handling portion of each of the robot(s) 16, a second machine vision system 22B2 may be located adjacent to a storage area for the wheels 12. Any number and location of machine vision system(s) 22B and/or related cameras may be provided. For example, without limitation, one or more of the machine vision system(s) 22B may be located overhead of the assembly area. The one or more machine vision system(s) 22B and/or other sensors 22 may be electronically connected to the controller 24. The machine vision system 22B, or the controller 24, may comprise object recognition software configured to process images provided from the cameras to detect various objects, surface features, text, combinations thereof, or the like.

The sensors 22 may, alternatively or additionally, comprise one or more continuous body velocity sensors 22C, such as, but not limited to, one or more lasers. The continuous body velocity sensor(s) 22C may be configured to record velocity of the vehicle 14 as it passes along the conveyor 18. The continuous body velocity sensors 22C may be in electronic communication with the controller 24. Velocity determinations may be made at the continuous body velocity sensors 22C and/or the controller 24.

In exemplary embodiments, without limitation, the vehicle 14 may enter a first zone Z1. Placement of the vehicle 14 and/or other components relative to a reference frame may be established by the sensors 22 and/or controller 24 while the vehicle 14 moves into and/or through the first zone Z1 in exemplary embodiments. For example, without limitation, the vehicle's 14 placement within a carrier trolly 19 of the conveyor 18, spacing of the carrier trolleys 19 along the conveyor 18, positioning of wheel studs and holes, stud arrangement within hubs 15, hub 15 arrangement on axles, wheel hole arrangement within wheels 12, vehicle 14 presentation, hub 15 presentation, combinations thereof, or the like, may vary.

In exemplary embodiments, a synchronization process may be undertaken by the system 10 within the first zone Z1 of the conveyor 18. A first machine vision system 22B1 may be positioned at an entrance to the first zone, such as at P1. The first machine vision system 22B1 may be configured to detect entry of the vehicle 14 within the first zone Z1, and/or as the vehicle 14 moves into the first zone Z1, determine vehicle 14 position and/or pose and/or hub 15 position and/or pose. Data from the first machine vision system 22B1 may be compared against one or more nominal frames, such as Tnom. Any offsets between Tnom and the vehicle 14 position and/or hub 15 may be determined, such as at the controller 24. Data from the first machine vision system 22B1 may be compared against one or more reference points, such as expected vehicle 14 position and/or pose, and/or hub 15 position and/or pose. Such reference points may comprise, for example without limitation, surface features or components thereof. For example, without limitation, the reference points may include wheel wells, hub 15 edges, wheel studs, axes center-points, brake pad locations, vehicle frame front, combinations thereof, or the like.

The controller 24 may comprise one or more software modules for calculating the offsets and/or compensatory adjustments, such as between measured positions and reference position, which may utilize artificial intelligence ("AI"). Such software modules may comprise those shown and/or described in at least US Pub. No. 2022/0016762 published Jan. 20, 2022 from U.S. application Ser. No. 17/490,810 (the "762 Pub."), the disclosures of which are hereby incorporated by reference, by way of non-limiting example. The controller 24 may utilize, for example without limitation, a multi-iterative, best fit, weighted vector analysis, to determine offsets.

The part detector 22A may be configured to detect the vehicle 14 at P2 and activate one or more robots 16 for wheel 12 mounting. The controller 24 may be configured to cause the robot(s) 16 to move at a velocity consistent with the vehicle 14, such as based on data from the one or more velocity sensors 22C at P3, by way of non-limiting example. The timing for activating the one or more robots 16 and their speed of travel may be made and/or adjusted initially, periodically, continuously, combination thereof, or the like, such as based on data taken and provided (e.g., from velocity sensor(s) 22C) periodically, continuously, combination thereof, or the like accordingly. Such adjustments may be made by way of the controller 24, by way of non-limiting example. The robot(s) 16 themselves may be entirely moveable, or a distal or other portion of the robot(s) 16 carrying the wheels 12 may be so adjusted for a matching velocity. The controller 24 may be configured to maintain velocity of the robot(s) 16 and/or wheel(s) 12 carried by the same within a predetermined range of the measured velocity of the vehicle 14.

The position and/or pose of the wheels 12 may be determined by a second machine vision system 22B2, by way of non-limiting example. Such review may be activated by detection of the vehicle 14 at the first machine vision system 22B1 and/or the part sensor(s) 22A, by way of non-limiting example. In other exemplary embodiments, the second machine vision system 22B2 may be periodically and/or continuously activated. The second machine vision system 22B2 may be configured to monitor position and/or of the wheels 12 relative to reference data. For example, without limitation, rim outline, rim features, rim holes (e.g., wheel stud holes), tire outline, combinations thereof, or the like may be measured against reference data. Offsets and/or adjustment for pickup and placement may be determined at the controller 24, such as at the AI module 23, by way of non-limiting example. The first and second machine vision systems 22B1, 22B2 may be entirely disparate subsystems, or may comprise common components.

At P4, the one or more robots 16 may be set to home positions. Instructions for mounting wheels 12 to the vehicle 14 may be provide by the controller 24.

An installation process may be undertaken by the system 10 at a second zone, Z2, of the system 10. At P5, the robot 16 may, based on instructions received from the controller 24, pick up one of the wheels 12 and place them on the vehicle 14. This may be repeated by the same or different robot(s) 16 to install wheels 12 at each of the hubs 15. The timing and positioning of the robot(s) 16 may be adjusted, such as at the controller 24, based on data received from the sensors 22 during the synchronization and/or installation processes. The robot(s) 16 may move the wheels 12 with the vehicle 14 along the conveyor 18 to match the velocity of the vehicle 14 during installation. For example, without limitation, the robot(s) 16 may move their arms and/or the robot(s) 16 themselves may be mounted on movable platforms.

At P8, a lug nut dispensing subsystem 26 may be activated. The lug nut dispensing subsystem 26, as explained in further detail herein, may be configured to position the lug nuts 20 for pickup by same or different robot(s) 16 and securement to the hubs 15 to secure the wheels 12 to the vehicle 14. One or more machine vision systems 22B may be utilized to account for any offsets in the lug nuts 20 and/or lug nut dispensing subsystem 26, such as at the controller 24 against reference data including expected lug nut 20 position and/or pose. In exemplary embodiments, without limitation, the lug nut dispensing subsystem 26 may be activated based on data from the sensors 22, such as, but not limited to, the parts sensor 22A.

At P7, the robot(s) 16 may be disengaged and returned to the home position for the next vehicle 14.

At P9, the same or different machine vision systems 22B may perform an inspection scan of the mounted wheel(s) 12. Data from the inspection scan may be transmitted to the controller 24, such as for comparison with reference points at the AI module 23 to update future offset calculations.

Operations of the controller 24 and/or AI module 23 may be performed in accordance with the '762 Pub., by way of non-limiting example.

Figure 3:
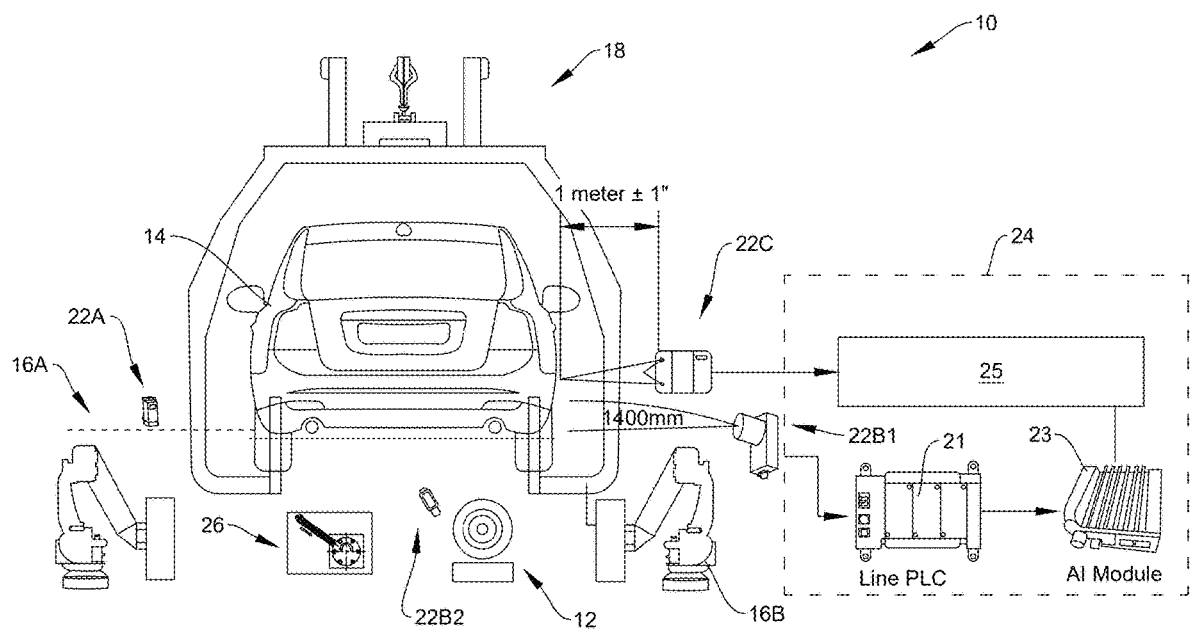
FIG. 3 is a front view of the system of FIG. 2.

As illustrated in FIG. 3, in exemplary embodiments, the second machine vision system 22B2 may be positioned and/or otherwise configured to capture wheel 12 data, including rim hole placement, as wheels 12 are provided for pickup by the robot(s) 16. Captured data may include wheel 12 size, hole placement, wheel 12 pose, and hole pitch, to name some non-limiting examples. The first machine vision system 22B1 may be positioned and/or otherwise configured to capture hub 15 data, including stem placement, as vehicles 14 are provided for wheel 12 mounting. Captured data may include hub 15 size, stud placement, hub 15 pose, and stud pose, to name some non-limiting examples. Data from the sensors 22, including but not necessarily limited to the first and second machine vision systems 22B may be provided to the controller 24. The controller 24 may comprise one or more line PLCs 21, the AI module 23, and/or one or more line tracking interface boards 25, by way of non-limiting example.

The velocity sensor 22C may be positioned and/or otherwise configured to capture velocity data for the vehicle 14, which may be independent of the carrier and/or conveyor 18 in exemplary embodiments. The velocity sensor 22C may comprise a pulse encoded laser sensor, by way of non-limiting example, such as, but not limited to, the LS9500410 Pulse encoder (9500 LaserSpeed Pro from NDC Technologies, https://www.ndc.com/). The velocity of the power and free conveyor 18 and the carrier are, in exemplary embodiments without limitation, not used for tracking.

Figure 4:
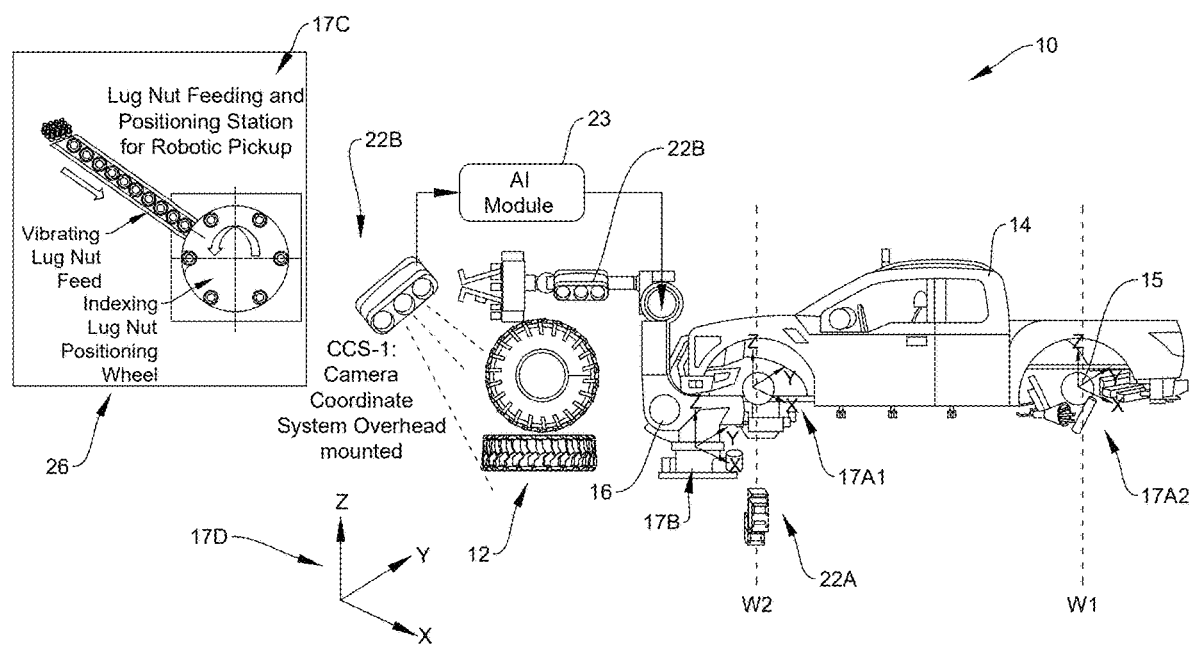
FIG. 4 is a side view of the system of another exemplary embodiment of the system of FIGS. 1-3.

As illustrated in FIG. 4, in exemplary embodiments, positions of the hubs 15 may be used to establish boundaries W1, W2 for the system 10. Reference frames 17A1, 17A2 may be established at each of the hubs 15 in exemplary embodiments, without limitation. Position and/or pose of the hubs 15 may be determined by one or more of the sensors 22. Reference frames 17B for the robot(s) 16 may be preprogrammed or otherwise known, such as from calibration. Reference frames 17C for the lug nut dispensing subsystem 26 may be preprogrammed or otherwise known, such as from calibration. Reference points may be preprogrammed or otherwise known, such as at the controller 24, for an ideal part relative to the reference frames 17C. For example, without limitation, ideal wheel stud placement around each hub 15, lug nut holes on each wheel 12, hub 15 placement relative to other parts of the vehicle 14, lug nut 20 placement relative to the lug nut dispenser subsystem 26, combinations thereof, or the like may be known and/or preprogrammed at the controller 24, such as for an ideal or reference part(s). Offsets from these reference points and/or reference frames 17 against actually measured data from the machine vision systems 22B may be made for one or more of the wheels 12, hubs 15, lug nuts 20, and/or the lug nut dispensing subsystem 26, by way of non-limiting example. The controller 24 may be configured to command the robot(s) 16 to operate in accordance with the offsets so that wheels 12 may be reliably mounted to the vehicles 14 despite these discrepancies. For example, the controller 24 may utilize an iterative, best fit algorithm, such as but not limited to as shown and/or described in the '762 Pub.

As noted, some or all of the machine vision systems 22B may be mounted overhead, at the robot(s) 16, at a storage area for the wheels 12, at a storage area for the lug nuts 20 and/or at the lug nut dispensing subsystem 26, combinations thereof, or the like. A system wide reference frame 17D may be preprogrammed or otherwise known, such as from calibration. Alternatively, or additionally, the system wide reference frame 17D may be set to one of the components, such as but not limited to the robot(s) 16, the vehicle 14, or the like.

Figure 5:
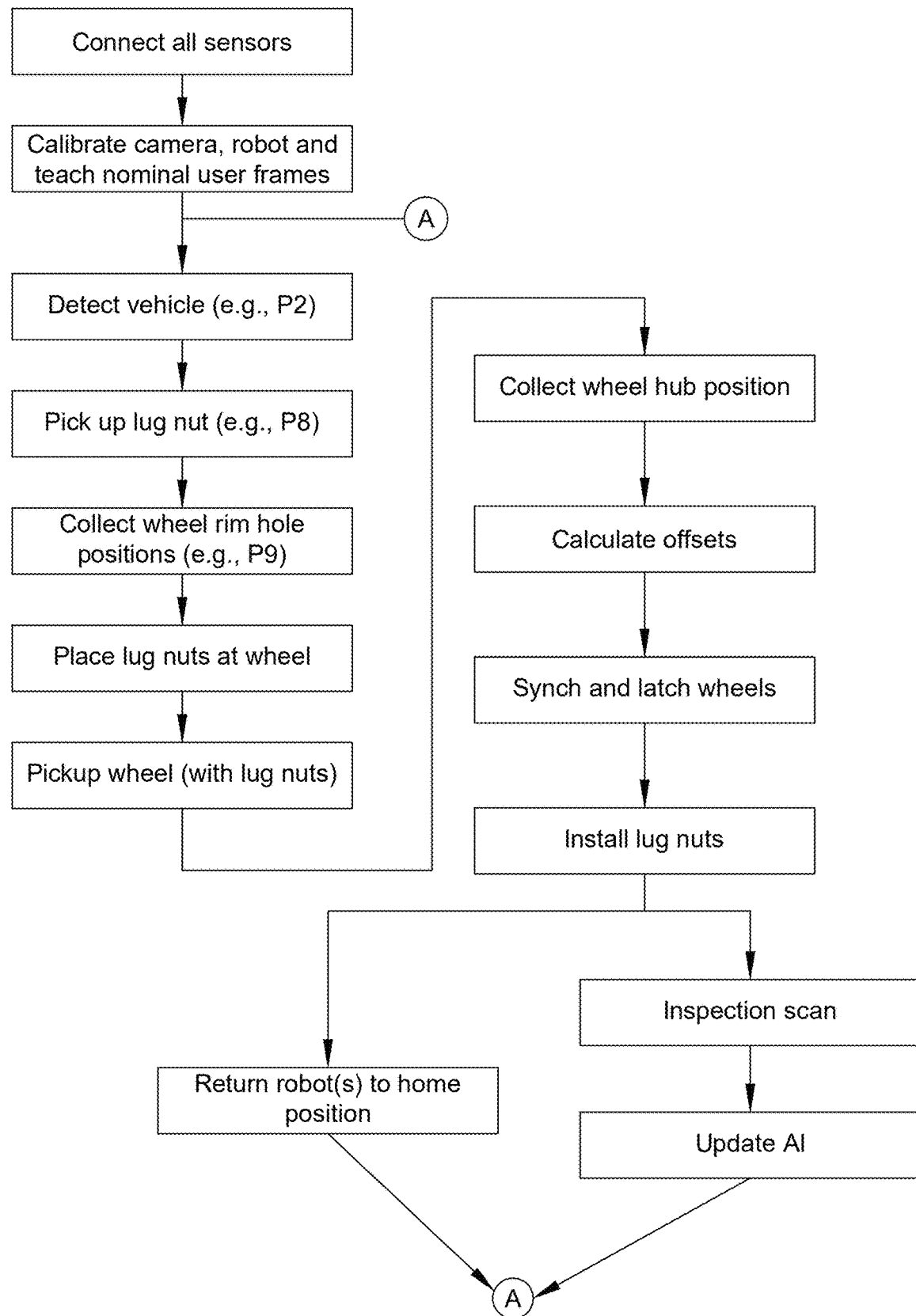
FIG. 5 is a flow chart with exemplary logic for operating the system of FIGS. 1-4.

FIG. 5 provides an exemplary method for operating the system 10. The sensors 22 may be connected. Some or all of the sensors 22 and/or robot(s) 16 may be calibrated, such as by operating the system 10 in a calibration mode. The controller 24 may be configured to command and/or control operation of the system 10 in such a calibration mode. Adjustments from calibration may be made at the controller 24, such as by way of the AI module 23.

Some or all of the sensors 22 and/or robot(s) 16 may be programmed with nominal user frames 17 at the controller 24. The vehicle 14 may be detected, such as at P2 by the part sensor 22A, and reported to the controller 24. The robot(s) 16 may be commanded, such as by the controller 24, to pick up the lug nuts 20, such as at the lug nut dispensing subsystem 26 (e.g., P8). The controller 24 may be configured to activate the first machine vision system 22B1 to collect wheel 12 rim hole positions, such as at P9.

The controller 24 may receive the wheel 12 data and output offset data, such as but not limited to new tool center point ("TCP") data to the robot(s) 16 for placing the lug nuts 20 into the wheel 12 and/or picking up the wheels 12. In exemplary embodiments, the robot(s) 12 may use a same spreader gripper, nut runner, and/or end/effector for lug nut 20 pickup and the wheel 12 pickup, though such is not required.

The robot(s) 16 may receive the offset data, such as from the controller 24, and move to a new pickup TCP to pick up the wheel 12 and standby for the vehicle 14 to enter Z2, such as at P4.

The hub 15 may be detected, such as by the part sensor 22A or the first machine vision system 22B1, the first and/or second machine vision systems 22B1, 22B2 may collect hub 15 position data and report the same to the controller 24.

The controller 24, such as but not limited to the AI module 23, may receive the hub 15 data and output offset data, such as but not limited to new tool center point ("TCP") data to the robot(s) 16 for placing the lug nuts 20 into the hubs 15 and/or placing the wheels 12.

The robot(s) 16 may receive the offset data and move to a new pickup TCP to start synchronization and move to latch starting point, such as at P3.

At P4, for example, the robot(s) 16 may begin latching the wheels 12 to the hubs 15.

At P5, for example, the robot(s) 16 may finish latching the hubs 15, and start to install the lug nuts 20.

At P6, for example, the robot(s) 16 may finish installing the lug nuts 20.

At P7, for example, the robot(s) may leave the vehicle 14 and return to a home position to await the next vehicle 14.

At P9, the same or different machine vision system 22B may perform an inspection scan of the mounted wheel(s) 12. Data from the inspection scan may be transmitted to the controller 24, such as for comparison with targets at the AI module 23 and updating to future offset calculations.

A table 30 with exemplary input values, order of operations information, abbreviations, number type, formula, and examples for operating the system 10 is provided below. Operations 6, 7, and 8, by way of non-limiting example, may occur in parallel with one another. Certain items of Table 1 are made with reference to the figures, including FIG. 6.

| Order of operations | Tracking Variable | Abbreviation | Number Type | Formula | Example |
|---|---|---|---|---|---|
| | ParameterNumber or GroupNumber | | | | Group1 |
| | ConveyorBelt | | Not used | | Axis3 (encoder) |
| | Execute | | | | Done |

-continued

| Order of operations | Tracking Variable | Abbreviation | Number Type | Formula | Example |
|---|---|---|---|---|---|
| 1 | ConveyorBelt Origin (This is typically Taught, move TCP to belt origin point and use 3 points to set user frame and define X, Y etc.) | CBO | Vector XYZrpw | Offset from Robot Coordinate System | X = 10 Y = 8 Z = 10 Rx = 0, Ry = 0, Rz = 25 |
| 7 | InitialWheelPosition (Acquired from camera, e.g., 22B2) once hub 15 crosses conveyor 18 origin | IWP | Vector XYZrpw | Offset from CBO acquired from camera (e.g., 22B2, on robot arm) (not initially known) | X = −22 Y = 0 Z = 50 Rx = 0, Ry = 0. Rz = 0 |
| 6 | RecordedConveyorPosition (Acquired from camera, e.g., 22B2) | RCP | Vector XYZrpw | Conveyor 18 position at execute trigger acquired from the camera (e.g., 22B2) | X = 10 Y = 8 Z = 10 Rx = 0, Ry = 0, Rz = 25 |
| 2 | StartDistance | SD | Real number | | Fixed value = 15 units |
| 3 | EndDistance | ED | Real number | Fixed value | Fixed value = 100 units |
| 4 | TrackOption: <br><br>StatDist/ ConveyorDist = 10 units TCPDist = 0.5 * 10 = 5 units MasterDistance = part in sync zone mode SyncOutDistance = 15 units | TCPD | Real no. Real no. True/false Real no. | ErrorID TCPD = 0.5 * CD | 10 units 5 units <br><br>SyncOut after 85 units 15 units |
| 5 | ExecutionMode Start when camera (e.g., 22B1) triggers | | | When to begin tracking: | Immediate, Delayed or Queued |

Figure 6:
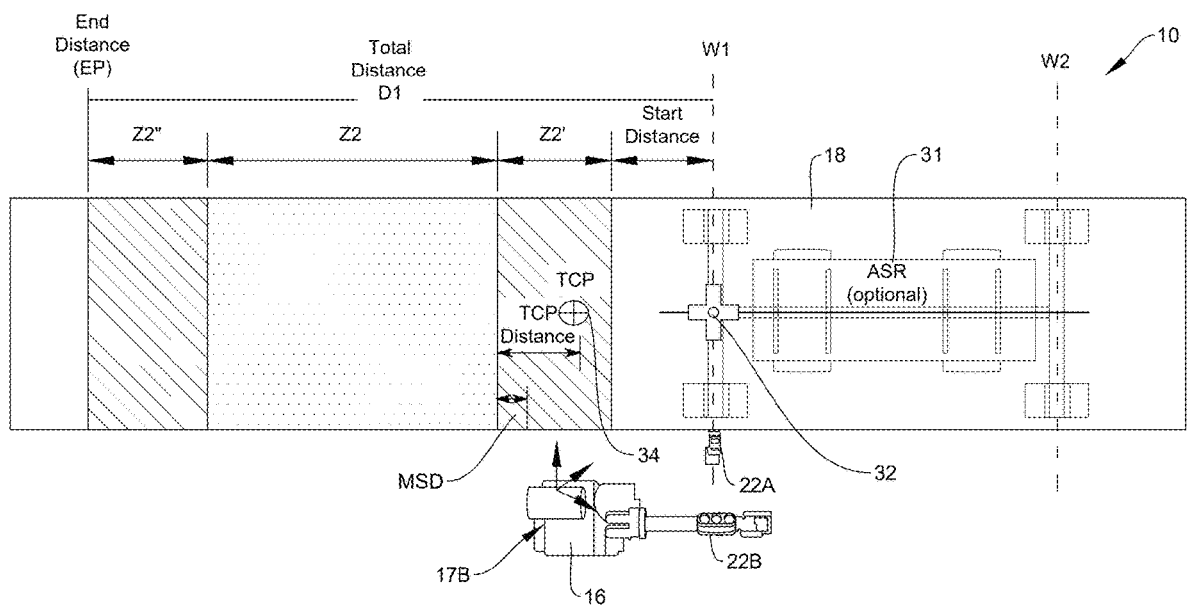
FIG. 6 is a simplified plan view of the systems of FIGS. 1-4 illustrating exemplary operation zones.

As illustrated in FIG. 6, by way of example, without limitation, a position of the conveyor 18 may be recorded and stored, such as at the controller 24, when tracking function triggered and started, such as by way of activation of the part sensor 22A by a vehicle 14 and/or machine vision system 22B. Upon activation, a vehicle origin 32 may be established, such as W1 located at the front hubs 15 of the vehicle 14. The vehicle origin 32 may be set to zero (e.g., (0, 0, 0, 0, 0, 0)).

Offsets between the vehicle origin 32 and the world origin 17D may be determined, such as at controller 24 and/or the AI module 23. A TCP 34 based on the offset may be determined. A subzone, Z2', may be established for syncing in of the vehicle 14 and robot(s) 16. This may provide space and distance to match robot(s) 16 movement with the vehicle 14 before mounting the wheels 12. Within zone 2, which may be a synchronization zone, the robot(s) 16 may latch onto the hub 15 and tighten the lug nuts 20. A subzone, Z2'', may be established for syncing out of the vehicle 14 and robot(s) 16 where the robot(s) 16 detach from the vehicle 14, slow, and return to a home position.

All distance values may be integers and real numbers.

In exemplary embodiments the TCP 34 may be determined as the total distance D1 divided in half. The end point, EP, may be known or preprogrammed.

A minimum synchronization distance (MSD) between the TCP 34 and the beginning of Z2 may be the minimum area for aborting the wheel 12 mounting.

Figure 7:
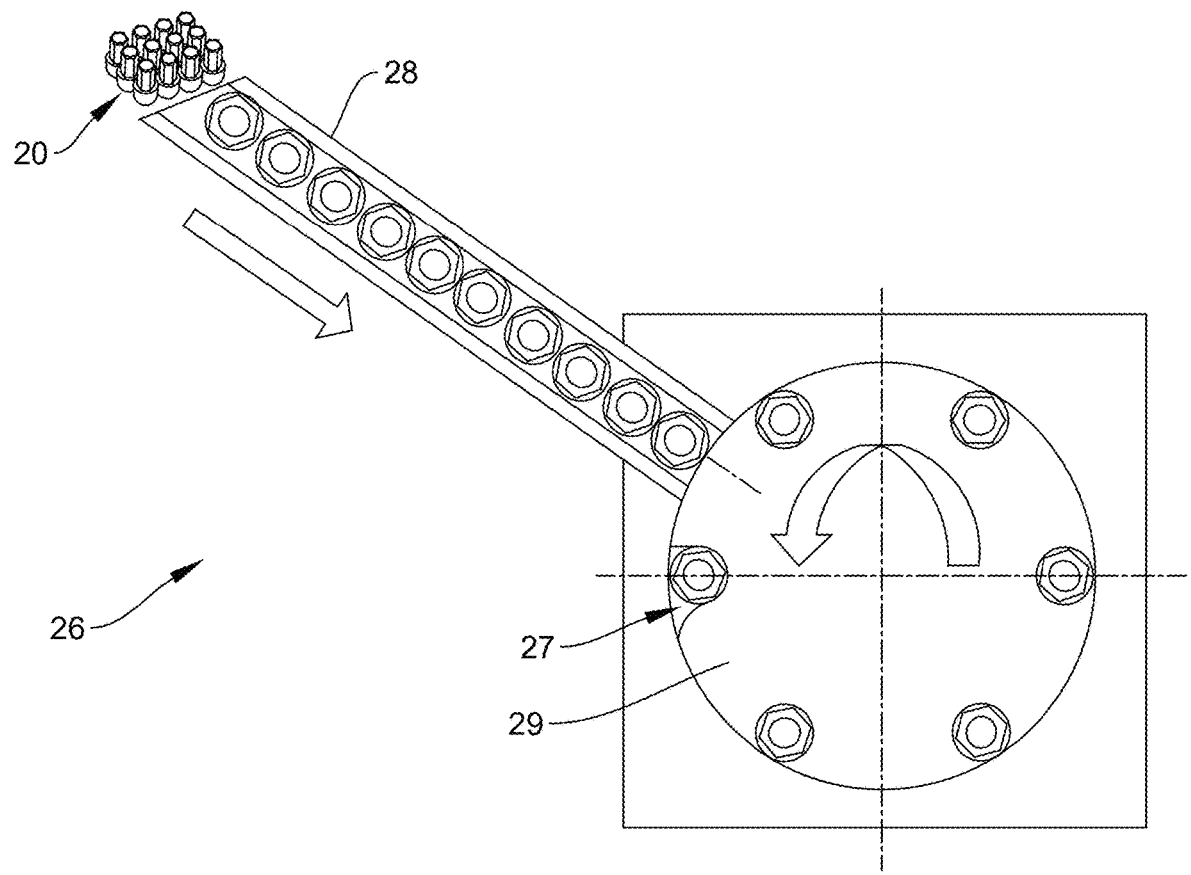
FIG. 7 is a detailed top view of an exemplary lug nut dispensing subsystem for use with the systems and methods of FIGS. 1-6.

As illustrated in FIG. 7, the lug nut dispensing subsystem 26 may comprise a repository of lug nuts 20. A feed may be configured to move the lug nuts 20 to an indexing lug nut positioning wheel 29, such as, but not limited to, by gravitational forces and/or vibration. The indexing lug nut positioning wheel 29 may comprise indents 27, each configured to accommodate a single one of the lug nuts 20. In this manner, the lug nuts 20 may be dispensed one at a time in a spaced apart manner. Spacing and/or shape of the indexing lug nut positioning wheel 29 may be configured to space the lug nuts 20 for pickup by a nut runner attachment on one or more of the robot(s) 16 in exemplary embodiments, without limitation.

The lug nuts 20 may be secured within spaces of the wheel 12 configured to accommodate the same. For example, without limitation, continued turning of the indexing lug nut positioning wheel 29 may move each of the lug nuts 20 into a respective space on the wheel 12. The wheel 12 may be positioned below the indexing lug nut positioning wheel 29, in exemplary embodiments, to receive the lug nuts 20. A spreader gripper, for example, without limitation, may be used by the robot(s) 16 to grasp and move the wheels 12. Alternatively, or additionally, the robot(s) 16 comprise one or more adapters configured to secure the lug nuts 20 in their spaced locations when retrieved from the lug nut positioning wheel 29.

The indexing lug nut positioning wheel 29 may be rotated to fill each of the indents 27 periodically.

Multiple lug nut dispensing subsystems 26 may be provided and/or utilized.

Figure 8A:
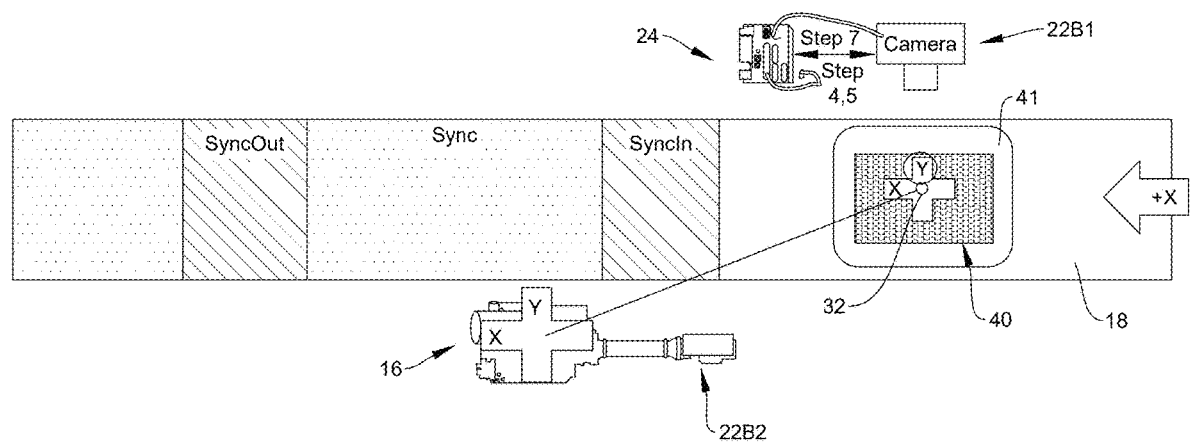
FIG. 8A is a simplified plan view of the system of FIG. 6 in a calibration mode.
Figure 8B:
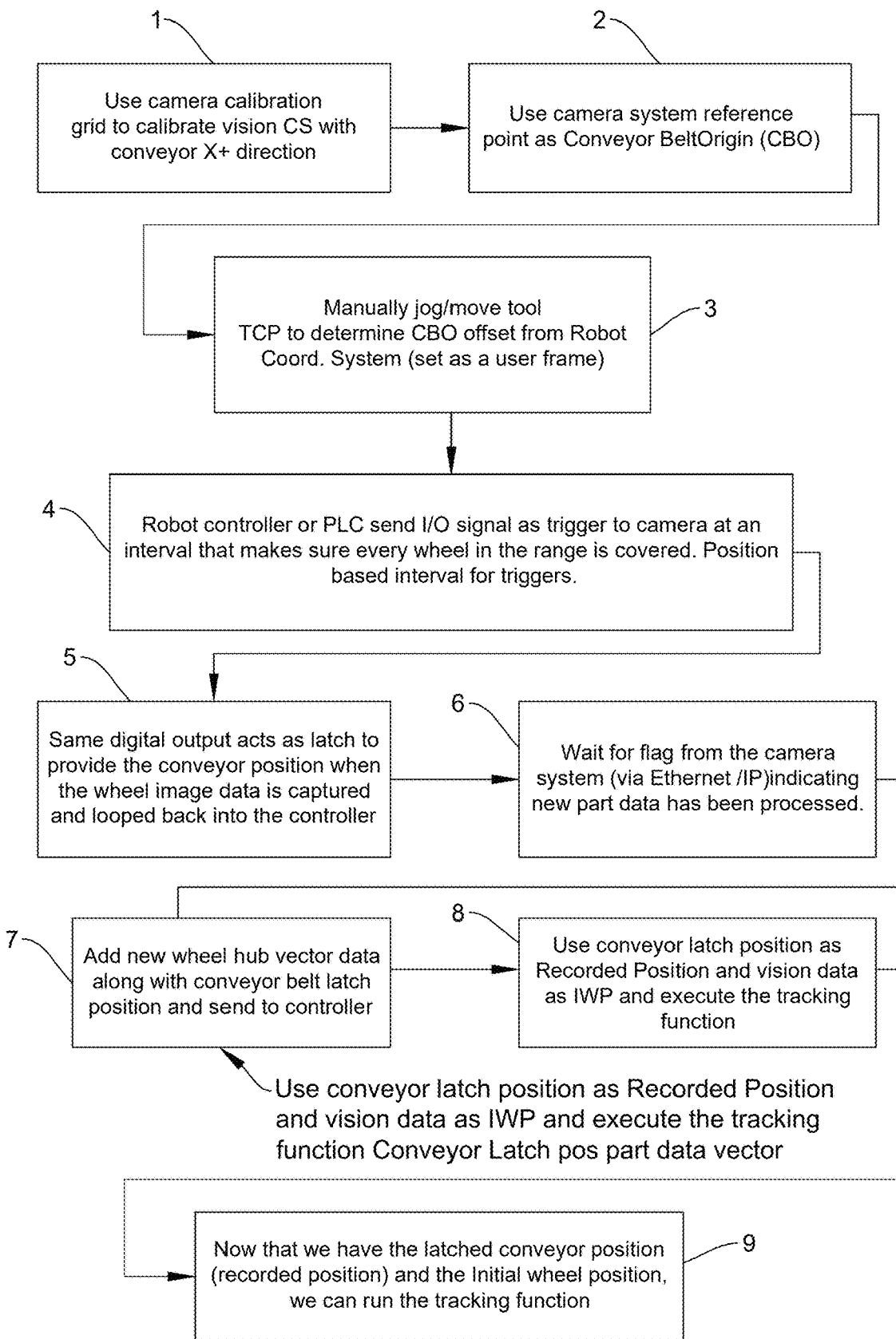
FIG. 8B is a flow chart with exemplary logic for operating the system of FIG. 8A in the calibration mode.

FIG. 8A illustrates the system 10 in a calibration mode, and FIG. 8B provides an exemplary method of using the same. In exemplary embodiments, without limitation, the machine vision system(s) 22B and/or other system 10 components may be calibrated by placement of a reference image 40, such as, but not limited to, a grid, target, electronically readable code (e.g., QR code), icon, combinations thereof, or the like on the conveyor 18. The locations of the reference image 40 relative to one or more fixed points may be known and/or provided to the controller 24. The reference image 40 may be placed in, or moved into, a field of view 41 of one or all of the cameras of the machine vision system(s) 22B. The camera(s) may be configured to read a center or other point of the reference image 40 as a vehicle origin 32. If the reference image 40 is moved to reach the field of view 41, an offset to account for the same may be provided to the controller 24. An offset may be determined as the reference image 40 moves into view of each of the cameras, in exemplary embodiments.

While one camera and/or machine vision system 22B may be discussed in some instances, any number of cameras and/or machine vision system(s) 22B in any number of locations may be utilized.

Some or all steps may be repeated, omitted, and/or performed in any order.

While wheel 12 mounting is primarily discussed, the system 10 may be adapted for mounting or otherwise installing other vehicle 14 components while partially assembled while the vehicle 14 is moving, including but not necessarily limited to, seating, interior fabric, entertainment systems, navigational systems, instruments, interior trim, safety components, vehicle 14 controls, combinations thereof, or the like, such as in a fixtureless manner.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for mounting wheels to partially assembled vehicles in motion, said system comprising:
    conveying subassemblies for transporting the partially assembled vehicles through a work area;
    a first set of one or more robots configured to manipulate wheels for the partially assembled vehicles, where said first set of one or more robots are configured for dynamic travel through the work area alongside the conveying subassemblies at a non-zero velocity such that the velocity of the first set of one or more robots can be made consistent with that of moving components of the conveying subassemblies;
    a second set of one or more robots configured to manipulate lug nuts for the wheels;
    one or more sensors configured to sense characteristics of the partially assembled vehicles at the work area;
    one or more machine vision systems positioned to view some or all of the work area; and
    a controller in electronic communication with the first set of one or more robots, the second set of one or more robots, the one or more sensors, and the one or more machine vision systems, said controller comprising software instructions which when executed, configure the controller to:
        receive data from the one or more sensors indicating speed and position information for the partially assembled vehicles at the work area;
        receive data from the one or more machine vision systems regarding characteristics of the wheels, including rim outline position information and rim hole position information;
        command the second set of one or more robots to place a plurality of the lug nuts at the wheels;
        receive data from the one or more machine vision systems regarding characteristics of the partially assembled vehicles including wheel hub position information and wheel stud hole position information;
        calculate offsets between the characteristics of the wheels and reference characteristics of the wheels, including reference rim outline position information and reference rim hole position information, as well as the characteristics of the partially assembled vehicles and reference characteristics of the partially assembled vehicles, reference wheel hub position information and reference wheel stud hole position information, using an artificial intelligence model; and command the first set of one or more robots to place the wheels with the lug nuts at wheel mount areas of the partially assembled vehicles by matching the speed and position of the partially assembled vehicles through the work area with the first set of one or more robots such that the wheels are installed while the partially assembled vehicles remain in motion.

2. The system of claim 1 wherein:
the artificial intelligence model utilizes a multi-iterative, best fit, weighted vector analysis.

3. The system of claim 2 wherein:
the controller comprises additional software instructions, which when executed, configure the controller to:
receive inspection scan data from the one or more machine vision systems regarding position of the wheels installed at the vehicles; and
update weighting of the artificial intelligence model in accordance with the inspection scan data.

4. The system of claim 2 wherein:
the controller comprises additional software instructions, which when executed, configure the controller to:
receive calibration scan data from the one or more machine vision systems regarding position of a reference image placed at the conveying subassembly; and
update weighting of the artificial intelligence model in accordance with the calibration scan data.

5. The system of claim 4 wherein:
the reference image comprises at least one optically scannable code for reading by the one or more machine vision systems.

6. The system of claim 5 wherein:
the conveying subassemblies comprise carrier trolleys or hangers attached to a fixed conveyor track for movement;
each of said carrier trolleys or hangers is adapted to hold one of said partially assembled vehicles during travel through the work area;
the at least one optically scannable code comprises a quick reference (QR) code; and
the reference image is placed at one of the carrying trolleys or hangers of the conveying subassembly.

7. The system of claim 1 wherein:
the one or more sensors comprise a continuous body velocity sensor and a part sensor.

8. The system of claim 1 further comprising:
a lug nut dispensing subsystem configured to place the lug nuts for the first set of one or more robots to pick up.

9. The system of claim 8 wherein:
the lug nut dispensing subsystem comprises a vibratory feed chute and a rotating wheel with multiple recesses sized to accept a single one of the lug nuts.

10. The system of claim 8 wherein:
the one or more machine vision systems comprise a first set of one or more cameras positioned to view a storage area for the wheels, a second set of one or more cameras positioned to view the lug nut dispensing subsystem, and a third set of one or more cameras positioned to view a first portion of the work area.

11. The system of claim 1 wherein:
the controller comprises additional software instructions, which when executed, configure the controller to command the first set of one or more robots to tighten the lug nuts when the wheels are placed at the partially assembled vehicles.

12. The system of claim 1 wherein:
the conveying subassembly is in electronic communication with the controller to provide the speed and position information.

13. The system of claim 1 wherein:
the controller comprises a line PLC, an AI module, and line tracking interface board.

14. The system of claim 1 wherein:
the conveying subassemblies comprise carrier trolleys or hangers attached to a fixed conveyor track for movement; and
each of said carrier trolleys or hangers is adapted to hold one of said partially assembled vehicles during travel through the work area.

15. A method for mounting wheels to a partially assembled vehicle in motion, said method comprising:
transporting the partially assembled vehicle continuously forward through a work area by way of a conveying subsystem, said conveying subassemblies comprising carrier trolleys or hangers attached to a conveyor for movement along a fixed pathway of the conveyor, each of said carrier trolleys or hangers adapted to hold one of said partially assembled vehicles during travel through the work area;
receiving, at a controller, data from a part sensor indicating entrance of the partially assembled vehicle into the work area;
commanding, by way of the controller, a continuous velocity sensor to measure speed data for the partially assembled vehicle at the work area;
receiving, at the controller, the speed data from the continuous velocity sensor;
receiving, at the controller, image data from a first machine vision camera regarding wheel rim hole positions for a wheel located at a storage area;
calculating, at the controller, a first set of offsets between the rim hole positions and expected rim hole positions using an artificial intelligence model;
commanding, by way of the controller, a first robot to place one of the lug nuts at each of the rim hole positions in accordance with the first set of offsets;
receiving, at the controller, data from a second machine vision camera image data regarding wheel hub position;
calculating, at the controller, a second set of offsets between the wheel hub position and expected wheel hub position using the artificial intelligence model;
commanding, by way of the controller, the first robot to place the wheel with the lug nuts at the hub of the partially assembled vehicle in accordance with the second set of offsets including by commanding, by the way of controller, the first robot to dynamically move in ways matching the speed and position of the partially assembled vehicle through the work area by one of the carrier trolleys or hangers such that the wheel is installed to the partially assembled vehicle while the partially assembled vehicle remains in motion along the conveyor;
receiving, at the controller, inspection scan data from a third machine vision camera regarding actual position information for the installed wheel; and
updating, at the controller, the artificial intelligence model in accordance with the inspection scan data.

16. The method of claim 15 wherein:
the artificial intelligence model utilizes a multi-iterative, best fit, weighted vector analysis; and the step of updating, at the controller, the artificial intelligence model in accordance with the inspection scan data comprises updating weighting of the artificial intelligence model.

17. The method of claim 16 further comprising:
depositing a reference image comprising at least one optically scannable code at the conveying subsystem for movement through the work area;
receive calibration scan data from at least the second machine vision camera regarding position of the reference image at the conveying subassembly, said reference image comprising at least one optically scannable code; and
update weighting of the artificial intelligence model in accordance with the calibration scan data.

18. The method of claim 17 further comprising:
commanding, by way of the controller, the first robot to tighten the lug nuts at the wheel installed to the partially assembled vehicle;
commanding, by way of the controller, the first robot to disengage the wheel of the partially assembled vehicle; and
commanding, by way of the controller, the first robot to return to a home position at the work area.

19. A system for mounting wheels to a partially assembled vehicle in motion, said system comprising:
a conveying subassembly for transporting the partially assembled vehicle through a work area, said conveying subassemblies comprising a conveyor and carrier trolleys or hangers attached to the conveyor for movement along a fixed track, each of said carrier trolleys or hangers adapted to hold one of said partially assembled vehicles during travel through the work area;
a first set of robots configured to manipulate the wheels for the vehicle and dynamic travel through the work area alongside the conveying subassembly at a non-zero velocity such that the velocity of the first set of one or more robots can be made consistent with that of the carrying trolleys or hangers;
a second set of robots configured to manipulate lug nuts for the wheels;
a part sensor located at an entrance portion of the work area configured to detect the partially assembled vehicle within the work area;
a continuous velocity sensor located at the entrance portion of the work area configured to measure velocity of the partially assembled vehicle at the work area;
a machine vision system comprising:
a first set of cameras positioned to view a storage area for the wheels;
a second set of cameras positioned to view the entrance portion of the work area; and
a third set of cameras positioned to view an exit area of the work area; and
a controller in electronic communication with each of the first set of robots, the second set of robots, the part sensor, the continuous velocity sensor, and the machine vision system, said controller comprising software instructions which when executed, configure the controller to:
receive data from the part sensor indicating entrance of the partially assembled vehicle to the work area, and subsequently command the continuous velocity sensor measure speed data for the partially assembled vehicle at the work area;
receive image data from the first set of cameras regarding wheel rim hole positions for a set of the wheels to be installed to the partially assembled vehicle;
calculate a first set of offsets between the rim hole positions of each of the set of wheels and expected rim hole positions for the wheels using an artificial intelligence model;
command the second set of robots to place one of the lug nuts at each of the rim hole positions of each of the set of wheels in accordance with the first set of offsets;
receive data from the second set of cameras regarding wheel hub positions of the partially assembled vehicle;
calculate a second set of offsets between the wheel hub positions of the partially assembled vehicle and expected wheel hub position using the artificial intelligence model;
command the first set of robots to place the set of wheels with the lug nuts at the hubs of the partially assembled vehicles in accordance with the second set of offsets by matching the speed and position of the partially assembled vehicle through the work area such that the set of wheels is installed while the partially assembled vehicle remains in motion;
receive inspection scan data from the third set of one or more cameras regarding position of the set of wheels installed at the partially assembled vehicle; and
update the artificial intelligence model in accordance with the inspection scan data;
wherein the artificial intelligence model utilizes a multi-iterative, best fit, weighted vector analysis.

20. The system of claim 19 wherein:
the controller comprises additional software instructions, which when executed, configure the controller to:
receive calibration scan data from the machine vision system, including at least the second set of cameras, regarding position of a reference image placed at one of the carrying trolleys or hangers of the conveying subassembly, said reference image comprising at least one optically scannable code; and
update weighting of the artificial intelligence model in accordance with the calibration scan data.

* * * * *